United States Patent
Lee et al.

(10) Patent No.: US 10,822,030 B2
(45) Date of Patent: Nov. 3, 2020

(54) PARKING GUIDANCE SYSTEM, PARKING GUIDANCE METHOD THEREOF AND AUTOMATIC PARKING SYSTEM

(71) Applicant: INDUSTRIAL TECHNOLOGY RESEARCH INSTITUTE, Hsinchu (TW)

(72) Inventors: Tse-Lin Lee, Hsinchu (TW); Wen-Han Lu, Hsinchu (TW); Yu-Chung Chen, Hsinchu (TW); Pin-Yung Chen, Hsinchu (TW)

(73) Assignee: INDUSTRIAL TECHNOLOGY RESEARCH INSTITUTE, Hsinchu (JP)

( * ) Notice: Subject to any disclaimer, the term of this patent is extended or adjusted under 35 U.S.C. 154(b) by 400 days.

(21) Appl. No.: 15/840,012

(22) Filed: Dec. 13, 2017

(65) Prior Publication Data
US 2019/0176888 A1 Jun. 13, 2019

(30) Foreign Application Priority Data
Dec. 12, 2017 (TW) .............................. 106143549 A

(51) Int. Cl.
*B62D 5/04* (2006.01)
*G05D 1/02* (2020.01)
(Continued)

(52) U.S. Cl.
CPC ....... *B62D 15/0285* (2013.01); *G05D 1/0088* (2013.01); *G05D 1/0225* (2013.01)

(58) Field of Classification Search
CPC .......... G05D 1/02; G05D 1/0088; B60Q 1/48; B62D 15/02; B62D 15/0285
(Continued)

(56) References Cited

U.S. PATENT DOCUMENTS

| 5,669,753 | A | | 9/1997 | Schween |
| 5,945,799 | A | * | 8/1999 | Shimizu ............. B62D 15/0285 318/587 |

(Continued)

FOREIGN PATENT DOCUMENTS

| CN | 102066186 | 5/2011 |
| CN | 102372000 | 3/2012 |

(Continued)

OTHER PUBLICATIONS

Taiwanese Decision of a Patent Grant for Taiwanese Patent Application No. 106143549 dated Sep. 13, 2018.
(Continued)

*Primary Examiner* — Tan Q Nguyen
(74) *Attorney, Agent, or Firm* — Amin, Turocy & Watson, LLP

(57) ABSTRACT

A parking guidance system and method and an automatic parking system. The method includes: detecting corners of a marked parking space; planning a vehicle's parking path based on the corners; and providing parking guidance based on the parking path. The planned parking path includes: a first straight path the vehicle will travel straight to a first turning point; a first turning path the vehicle will turn a first angle from the first turning point along the circumference of a first turning circle; a second straight path the vehicle will travel from the end point of the first turning path to a second turning point; a second turning path the vehicle will turn a second angle from the second turning point along the circumference of a second turning circle; and an intra-parking-space path the vehicle will travel from the end point of the second turning point to a stop point.

20 Claims, 18 Drawing Sheets

(51) Int. Cl.
*B62D 15/02* (2006.01)
*G05D 1/00* (2006.01)

(58) Field of Classification Search
USPC .......................................................... 701/23
See application file for complete search history.

(56) References Cited

U.S. PATENT DOCUMENTS

| | | | | |
|---|---|---|---|---|
| 6,611,744 | B1* | 8/2003 | Shimazaki | B60R 1/00 180/168 |
| 7,813,855 | B2* | 10/2010 | Watanabe | B62D 15/0285 180/204 |
| 8,085,167 | B2* | 12/2011 | Tanaka | B62D 15/0285 180/204 |
| 8,504,245 | B2* | 8/2013 | Sasajima | B60K 35/00 701/41 |
| 2004/0260439 | A1* | 12/2004 | Endo | B60Q 1/48 701/36 |
| 2010/0156671 | A1* | 6/2010 | Lee | B62D 15/027 340/932.2 |
| 2014/0368863 | A1 | 12/2014 | Suzuki et al. | |
| 2016/0375933 | A1 | 12/2016 | Hiei et al. | |

FOREIGN PATENT DOCUMENTS

| | | |
|---|---|---|
| CN | 105355083 | 2/2016 |
| CN | 106875736 | 6/2017 |
| JP | 2016-213551 | 12/2016 |
| JP | 2017-77823 | 4/2017 |
| TW | I301460 | 10/2008 |
| TW | 200910278 | 3/2009 |
| TW | I326645 | 7/2010 |
| TW | I335281 | 1/2011 |
| TW | 201111206 | 4/2011 |
| TW | 201421434 | 6/2014 |

OTHER PUBLICATIONS

Liu, et al. "A Path Planning Method for Assistant Parallel Car-Parking", 2012 Fifth International Symposium on Computational Intelligence and Design (ISCID), 2012, vol. 2, p. 65-68.

Jiang, "A Sensor guided parallel parking system for nonholonomic vehicles", ITSC2000 2000 Intelligent Transportation Systems Proceedings (Cat. No. 00TH8493), 2000, p. 270-275.

Perez-Morales, et al. "Autonomous Parking Using a Sensor Based Approach", 2016 IEEE 19th International Conference on Intelligent Transportation Systems (ITSC), 2016, p. 211-216.

Petrov, et al. "Automatic Vehicle Perpendicular Parking Design Using Saturated Control", 2015 IEEE Jordan Conference on Applied Electrical Engineering and Computing Technologies (AEECT), 2015, p. 1-6.

Hsu, et al. "Development of an Automatic Parking System for Vehicle", 2008 IEEE Vehicle Power and Propulsion Conference, 2008, p. 1-6.

Saleh et al. "Enhanced Algorithm for Autonomous Parallel Parking of a Car-like Mobile Robot", 2016 IEEE International Multidisciplinary Conference on Engineering Technology (IMCET), 2016, p. 191-195.

* cited by examiner

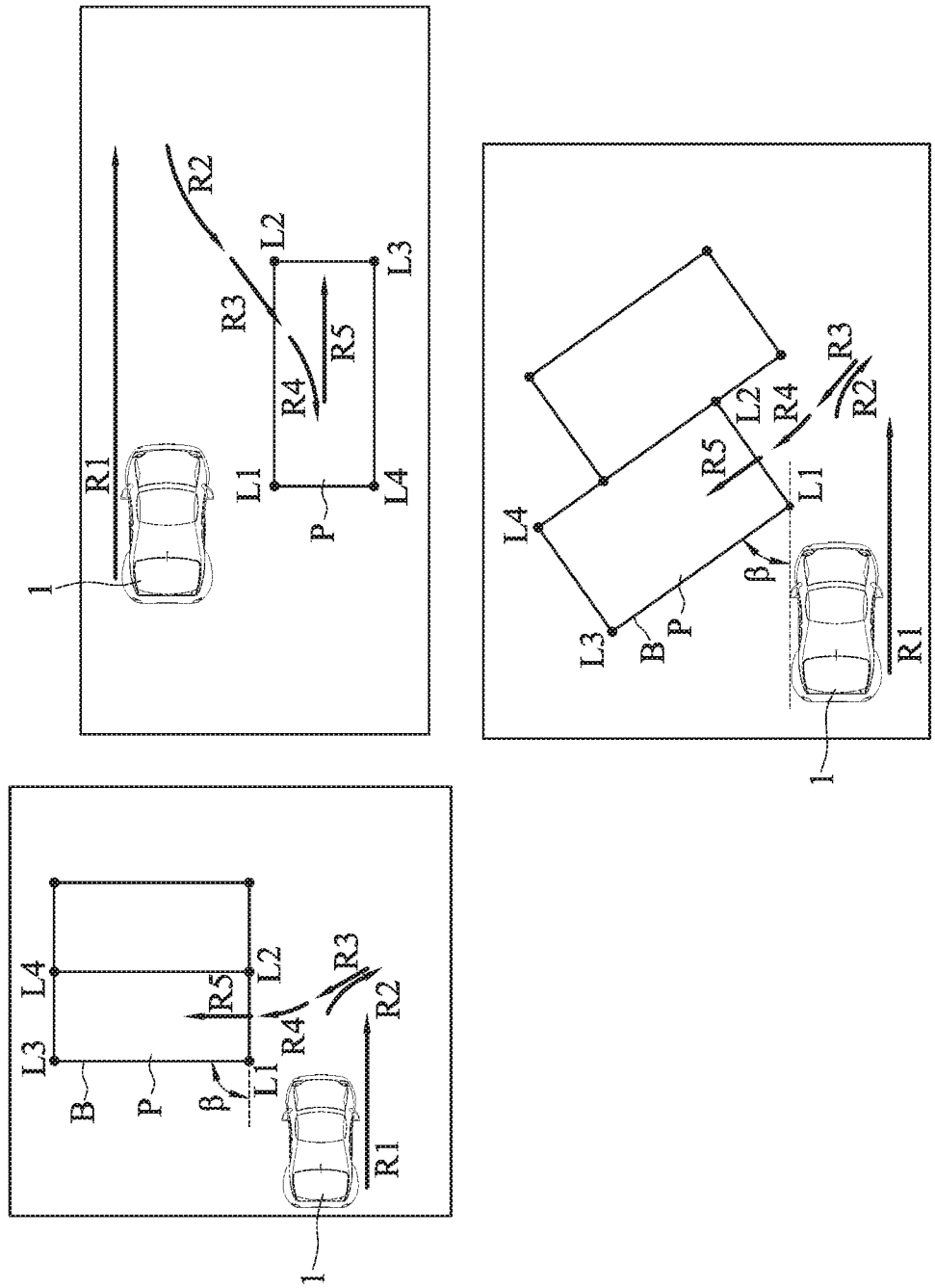

PARKING GUIDANCE SYSTEM, PARKING GUIDANCE METHOD THEREOF AND AUTOMATIC PARKING SYSTEM

CROSS-REFERENCE TO RELATED APPLICATION

The present disclosure is based on, and claims priority from, Taiwan Application Number 106143549, filed Dec. 12, 2017, the disclosure of which is hereby incorporated by reference herein in its entirety.

BACKGROUND

1. Technical Field

The present disclosure relates to automatic parking systems, and, more particularly, to a parking guidance system, a parking guidance method, and an automatic parking system using parking path planning.

2. Description of Related Art

There has been rapid development in the technology for driverless vehicles and various vehicle manufacturers have been putting their focus on the research and development of driverless vehicle techniques. Automatic parking techniques have been one of the most popular areas of focus.

Some vehicles can be installed with parking assistance devices for marking trajectories to assist users and reduce the level of difficulty in parking. However, despite of the assisted trajectories, it is still difficult for some to park their vehicles due to improper maneuvering.

The current semi-automatic parking techniques typically use distance sensors to detect parking spaces based on nearby vehicles. However, when a distance sensor to detect a parking space is used, obstacles have to be present on both sides of the parking space, and have to be of certain heights. When a vehicle is being maneuvered into a parking space with only markings on the ground and no nearby cars to assist in detection, it may be difficult to park the vehicle.

Moreover, there are approaches that identify a parking space by detecting markings of a parking space through other visual sensing methods to assist in the subsequent parking guidance or automatic parking. These methods do not depend on the presence of nearby vehicles, and allow vehicles to be parked in appropriate spaces based on the locations of the markings of the parking spaces. However, the image recognition techniques may be limited by the detection ranges and detection angles, for example, they may be susceptible to changes in the light and shadows. The performance of the parking guidance or automatic parking may be lowered when images cannot be properly detected to provide stable information during the whole parking process.

Therefore, the current techniques in the development of parking guidance or automatic parking are still bounded by many limitations resulting in difficulties in the applications of the relevant techniques.

SUMMARY

The present disclosure provides a parking guidance method, which may include: detecting a plurality of corner points of a parking space; planning a parking path of a vehicle based on the plurality of corner points, wherein the parking path includes: a first straight path, which is a trajectory that the vehicle will travel straight until reach a first turning point; a first turning path, which is an arc subtending a first angle that the vehicle will travel from the first turning point and turn along the circumference of a first turning circle; a second straight path, which is a trajectory that the vehicle will travel from a first end point of the first turning path to a second turning point; a second turning path, which is an arc subtending a second angle that the vehicle will travel from the second turning point and turn along the circumference of a second turning circle, wherein a sum of the first and second angles equal to an angle formed between a parallel line of the first straight path and a line marking for the parking space; and an intra-parking-space path, which is a trajectory that the vehicle will travel from a second end point of the second turning path to a stop point, and providing parking guidance based on the parking path.

The present disclosure further provides a parking guidance system, which may include: a parking space information capturing unit configured for obtaining position information of a plurality of corner points of a parking space through image recognition; and an onboard controller including: a parking path planning module configured for planning a parking path for the vehicle based on the position information of the corner points; and a parking guidance module configured for providing parking guidance based on the parking path.

The present disclosure further provides an automatic parking system, which may include: a parking space information capturing unit configured for obtaining position information of a plurality of corner points of a parking space through image recognition; and an onboard controller including: a parking path planning module configured for planning a parking path for the vehicle based on the position information of the corner points; a parking guidance module configured for providing parking guidance based on the parking path; and a parking actuation control module configured for performing actuation control on the vehicle based on the parking guidance to allow the vehicle to complete a parking process.

Compared to the prior art, the parking guidance system, the parking guidance method and the automatic parking system according to the present disclosure determine the relative position of the parking space with respect to the vehicle by identifying a line marking and the corner points for the parking space and plans an appropriate parking path after taking into account both surrounding information and vehicle status information. Thus, when there are only markings for a parking space on the ground without any nearby cars, the present disclosure is able to control acceleration, braking, turning, and gear switching of the vehicle via the onboard controller for automatic parking, or to indicate the parking path and corresponding actions for parking via the image display device to assist the user in manual parking, thereby addressing the safety and time-consuming issues encountered when traditionally parking a vehicle. In addition, if there is misjudgment or failure in image recognition performed by the parking space information capturing unit or during a period in which image recognition is unstable, the heading angle information acquiring unit can also be initiated to obtain heading angle information of the vehicle. At the same time, the parking space estimation module can be used to estimate the relative position of the parking space with respect to the vehicle to assist the onboard controller in resuming and finishing the parking process.

BRIEF DESCRIPTION OF THE DRAWINGS

FIG. 3A is a schematic diagram depicting various parking methods by reversing a vehicle into a parking space using the parking guidance system and the automatic parking system according to the present disclosure;

DETAILED DESCRIPTION OF THE EMBODIMENTS

The technical content of present disclosure is described by the following specific embodiments. One with ordinary skill in the art can readily understand the advantages and effects of the present disclosure upon reading the disclosure of this specification. Nonetheless, the present disclosure may also be practiced or applied using other different implementations.

Figure 1:
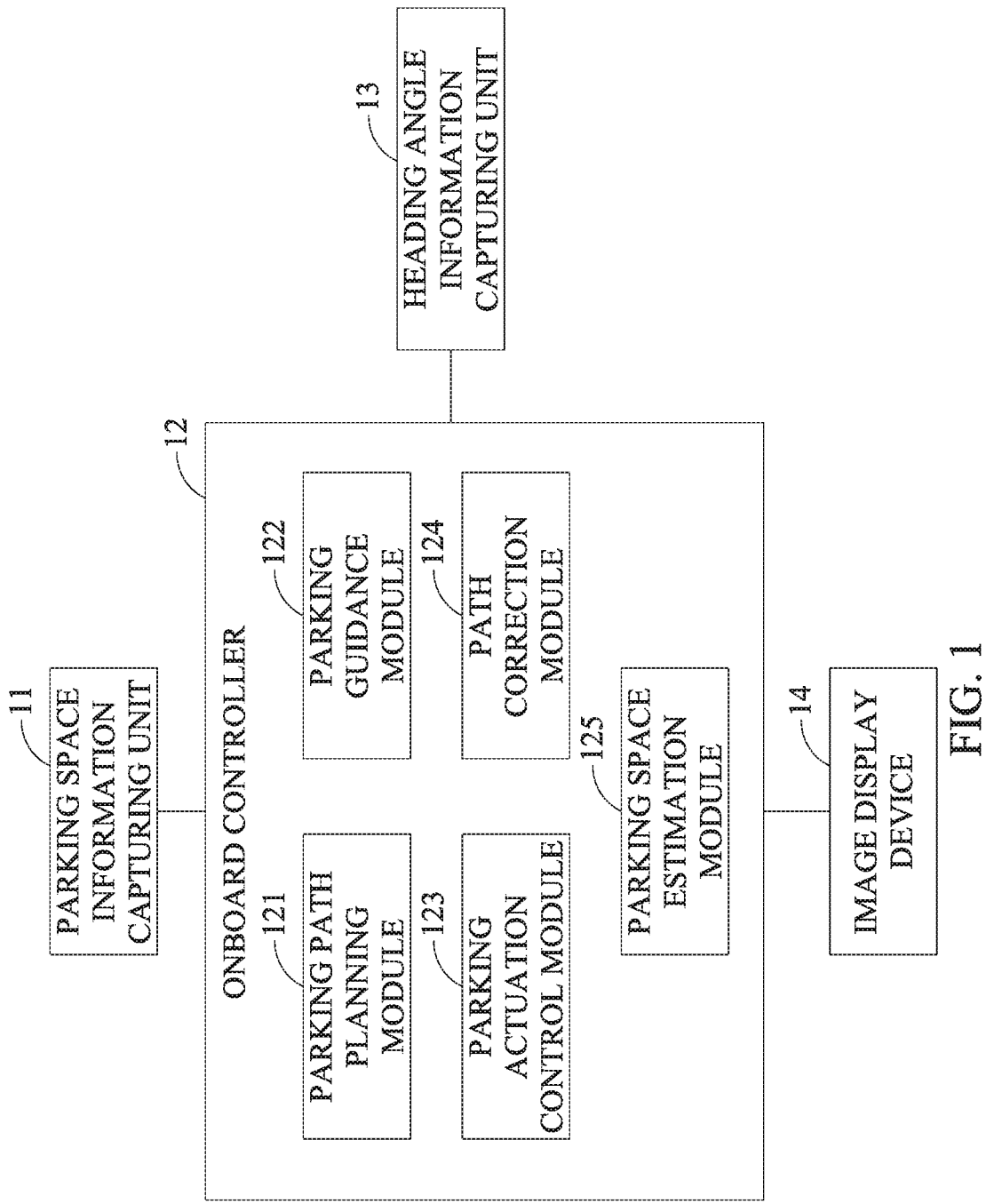
FIG. 1 is a block diagram depicting a parking guidance system and an automatic parking system according to the present disclosure.

FIG. 1 is a block diagram depicting a parking guidance system and an automatic parking system in accordance with the present disclosure. The parking guidance system and the automatic parking system according to the present disclosure can be integrated into a vehicle electronic system or independently installed. They include a parking space information capturing unit 11, an onboard controller 12, a heading angle information acquiring unit 13 and an image display device 14. In an embodiment, the parking space information capturing unit 11, the heading angle information acquiring unit 13, and the image display device 14 are electrically connected with the onboard controller 12.

Figure 2:
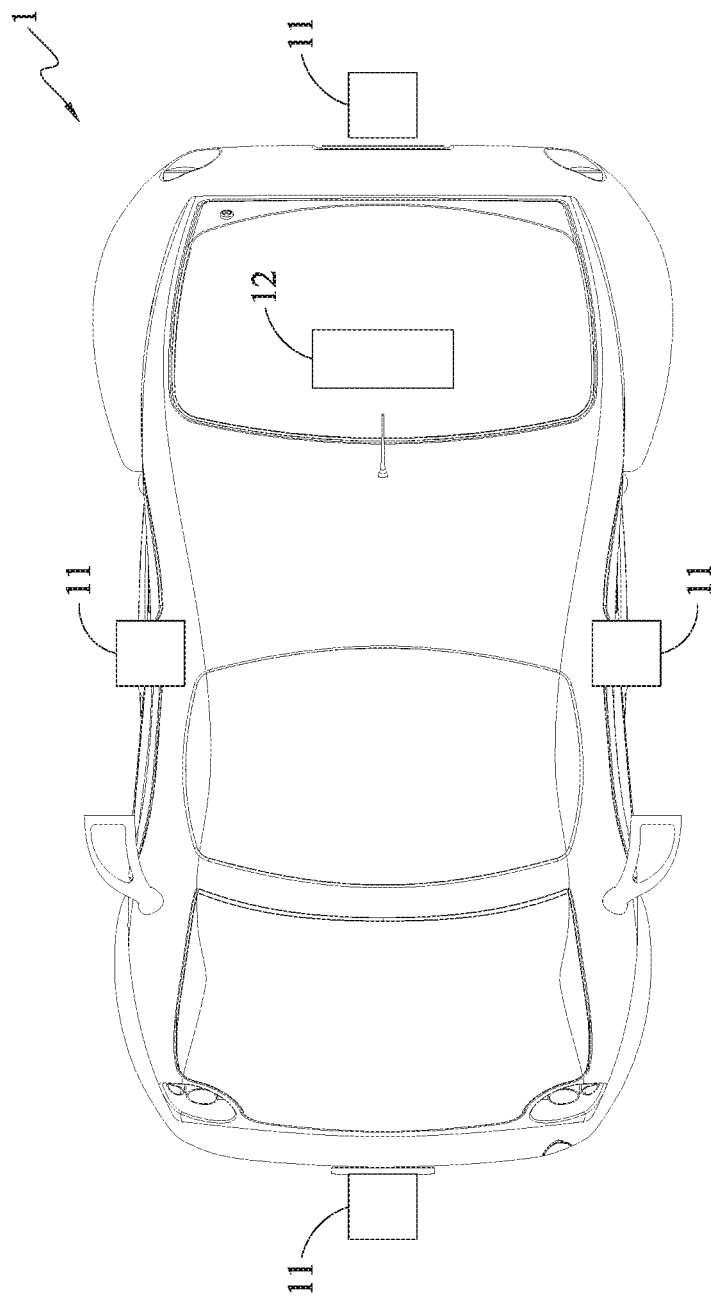
FIG. 2 is a schematic diagram depicting locations of a parking space information capturing unit and an onboard controller of the parking guidance system and the automatic parking system according to the present disclosure.

With reference to FIG. 2, a schematic diagram depicting the parking space information capturing unit 11 and the onboard controller 12 of the parking guidance system and the automatic parking system according to the present disclosure is shown. In an embodiment, the onboard controller 12 is provided in a vehicle 1, and the parking space information capturing unit 11 can be provided at the front, back, left and right of the vehicle 1. In other embodiments, the parking space information capturing unit 11 can also be provided only at the front and back or just at the top of the vehicle 1.

Figure 3B:
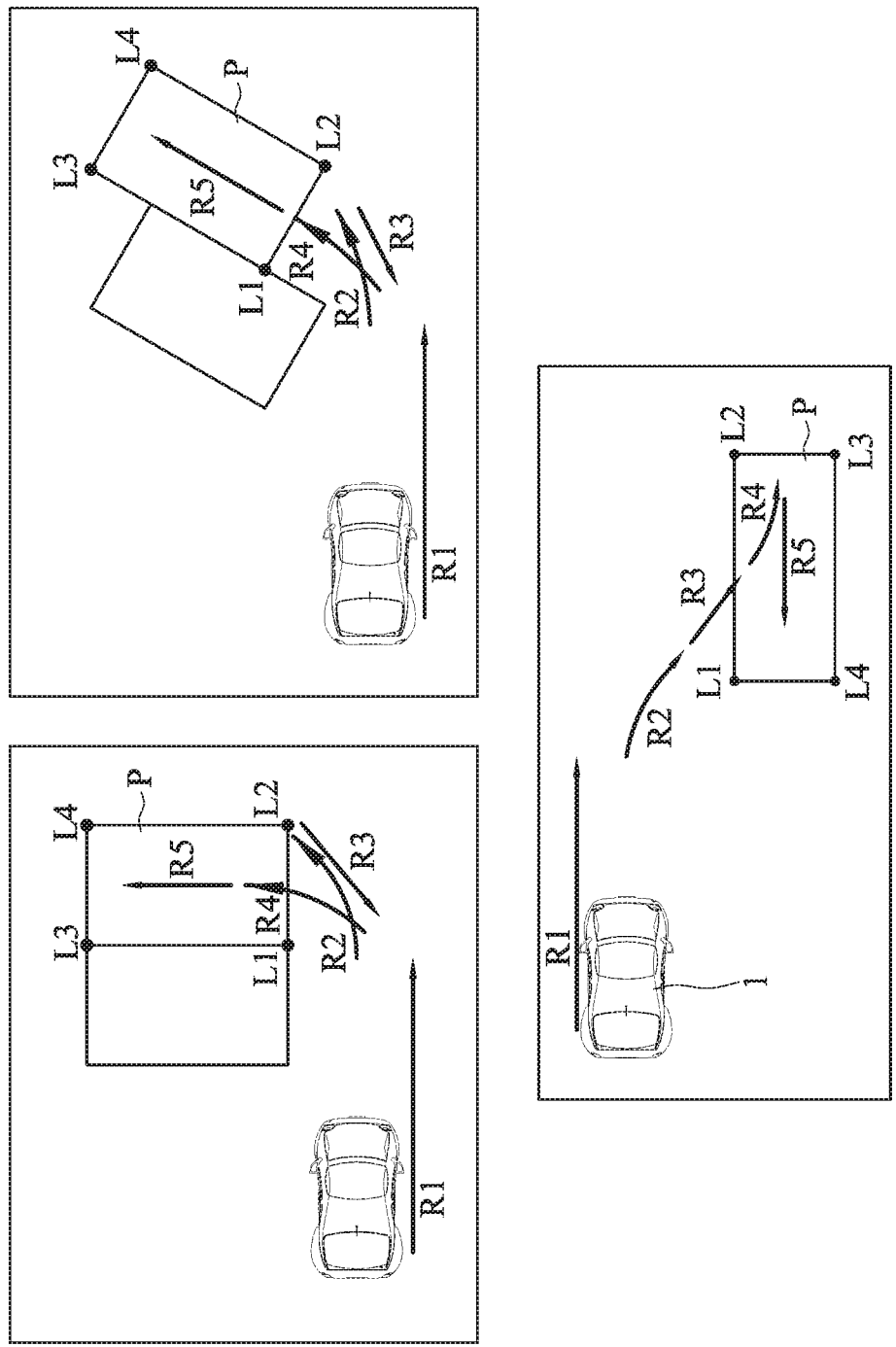
FIG. 3B is a schematic diagram depicting various parking methods by driving a vehicle front-first into a parking space using the parking guidance system and the automatic parking system according to the present disclosure.

With reference to FIGS. 3A and 3B, schematic diagrams illustrating parking methods of "reversing a vehicle" and "driving a vehicle front-first" into various parking spaces using the parking guidance system and the automatic parking system according to the present disclosure are shown. As can be seen, the present disclosure is at least applicable to parallel parking, perpendicular parking and angled parking. In other words, the parking method according to the present disclosure is suitable for six parking methods: parallel parking, perpendicular parking and angled parking by reversing a vehicle into a space (1) and parallel parking, perpendicular parking and angled parking by driving a vehicle front-first into a space (2).

In an embodiment, the parking space information capturing unit 11 of the parking guidance system according to the present disclosure is a device with a camera capable of recording and identifying images. With image identification, position information of a plurality of corner points L1-L4 and/or a line marking B of a parking space P, and a surrounding image of the parking space P can be acquired. As shown in FIG. 3A, when the vehicle 1 approaches a parking space P, the parking space information capturing unit 11 captures the surrounding image of the parking space P, and obtains position information of a plurality of corner points L1-L4 and/or a line marking B of the parking space P, wherein the position information of the corner points L1-L4 and/or the line marking B can be location coordinates of the corner points L1-L4 and/or the line marking B or the relative distances of the corner points L1-L4 and/or the line marking B with respect to the vehicle 1. In an embodiment, the parking space information capturing unit 11 may also detect obstacle information (e.g., a nearby vehicle) or surrounding environment information (e.g., a low wall) around the parking space to assist in subsequent setup of boundary condition.

In an embodiment, the parking space information capturing unit 11 sends the position information of the corner points L1-L4 and/or the line marking B to the onboard controller 12. The onboard controller 12 includes a parking path planning module 121 and a parking guidance module 122. The parking path planning module 121 calculates the relative position of the parking space P with respect to the vehicle 1 based on the position information of the corner points L1 and L2 and then starts planning a parking path. The parking path planning module 121 may also plan the parking path based on the parking method selected by a user (such as the six parking methods described earlier: parallel parking, perpendicular parking and angled parking by reversing a vehicle into a space (1) and parallel parking, perpendicular parking and angled parking by driving a vehicle front-first into a space (2)). The parking path may consist of a first straight path R1, a first turning path R2, a second straight path R3, a second turning path R4 and an intra-parking-space path R5. As shown in FIG. 3A, a parallel line of the first straight path R1 forms angle β with the line marking B. In parallel parking, the angle β is zero. In perpendicular parking, the angle β is 90 degrees. A first embodiment is described below by way of example using a perpendicular parking by "reversing into a parking space". Next, the parking guidance module 122 provides parking guidance based on the parking path planned by the parking path planning module 121 to guide the user maneuvering the vehicle 1 along the parking path planned by the parking path planning module 121 in order to park the vehicle 1 into the desired parking space.

Referring to FIGS. 4 to 8, schematic diagrams illustrating a first embodiment of a parking path planned by the parking guidance system and the automatic parking system according to the present disclosure are shown. When a vehicle 1 approaches a parking space P and the parking space information capturing unit 11 obtains the position information of a plurality of corner points L1-L2 and/or a line marking B of the parking space P, the parking path planning module 121 starts planning a parking path based on the relative positions of the corner points L1-L2 and/or the line marking B with respect to the vehicle 1.

First, based on the position information of the vehicle 1 and the parking space P and the parking method selected by the user, the parking path planning module 121 plans a route composed of a first straight path R1, a first turning path R2, a second straight path R3, a second turning path R4 and an intra-parking-space path R5 and analyzes composition parameters of the route. The composition parameters may be, for example, the gap between a front obstacle vehicle and the marking, the gap between a rear obstacle vehicle and the marking, the width of the vehicle, the road width, total length of the movement path, wherein some of the composition parameters are known (for example, obtained through the parking space information capturing unit 11), and the rest are yet to be determined.

Figure 5:
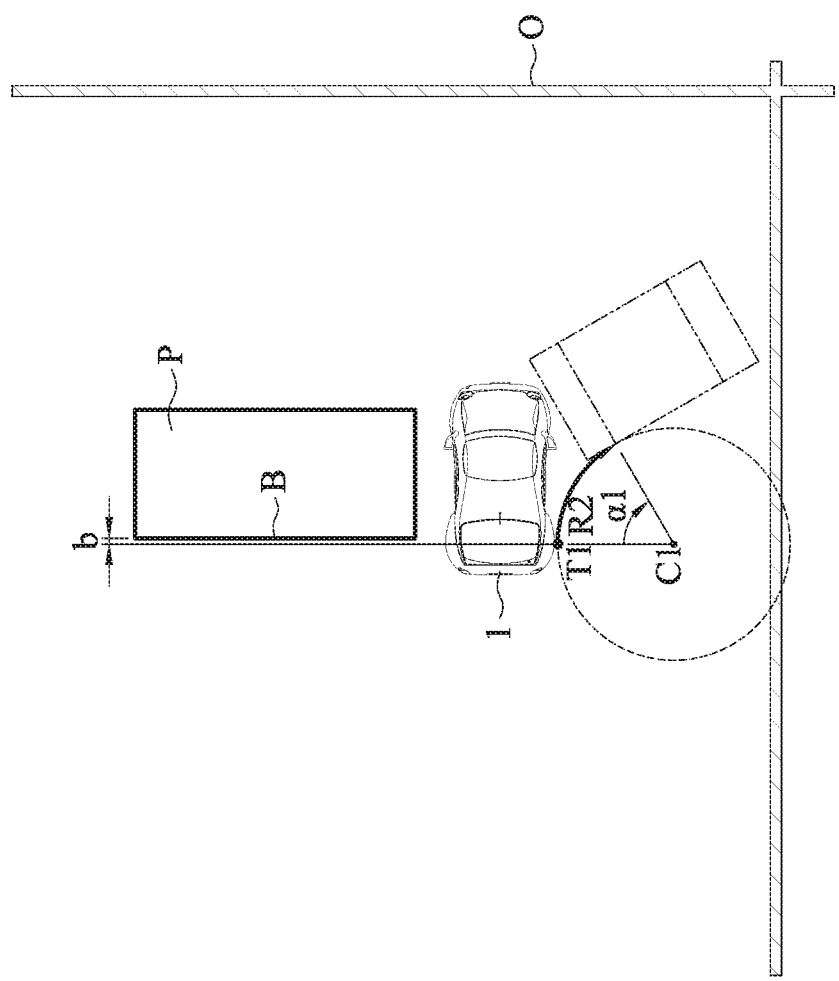
FIG. 5 is a schematic diagram depicting a first turning path of the parking path planned by the parking guidance system and the automatic parking system in accordance with the first embodiment of the present disclosure.

Next, through theoretical deduction, compositions to be determined are converted into functions of the known parameters, and each composition parameter is further defined as a function of a first angle $\alpha 1$ and a first constant b (f($\alpha 1$,b)), wherein the first angle $\alpha 1$ is a first turning angle of the vehicle 1 in the parking path, and the first constant b is the gap between a baseline from which the first turning begins in the parking path and the line marking B (see FIG. 5). In other words, the first angle $\alpha 1$ and the first constant b are both related to the first turning path R2. Next, after obtaining the first angle $\alpha 1$ and the first constant b, the parking path is calculated using the first angle $\alpha 1$ and the first constant b obtained. In other words, in the present disclosure, the numerous composition parameters are simplified into just two necessary parameters, which greatly reduces subsequent computation time and in turn the time required for parking.

In an embodiment, once a function of the first angle $\alpha 1$ and the first constant b is defined, the parking path planning module 121 may further setup a boundary condition. The boundary condition includes the position of at least one obstacle O or an ambient boundary range. In other words, the boundary condition is an ambient boundary or the boundary of an obstacle O. The obstacle O can be a fence, a low wall, a nearby car, a utility pole or the like. The vehicle 1 should avoid from coming into contact with the obstacle O when moving. The setup of the boundary condition may restrict the range of the values of the first angle $\alpha 1$ and the first constant b. This also in turn reduces the computation time for subsequent path planning.

Thereafter, in some embodiments, if the condition of the surrounding environment is simple in that the boundary condition can be looked up from a pre-established database, a pre-calculated path can be used without doing real-time calculations again. In some other embodiments, when the parking space information capturing unit 11 detects obstacle information (e.g., a nearby car) around the parking space, the parking path planning module 121 plans a safer and more conservative parking path based on the obstacle information to prevent the vehicle 1 from hitting these obstacles. In yet some other embodiments, when the parking space information capturing unit 11 detects obstacles around the parking space and is able to accurately locate the obstacles, the parking path planning module 121 calculates the shortest parking path using an iterative method.

Figure 4:
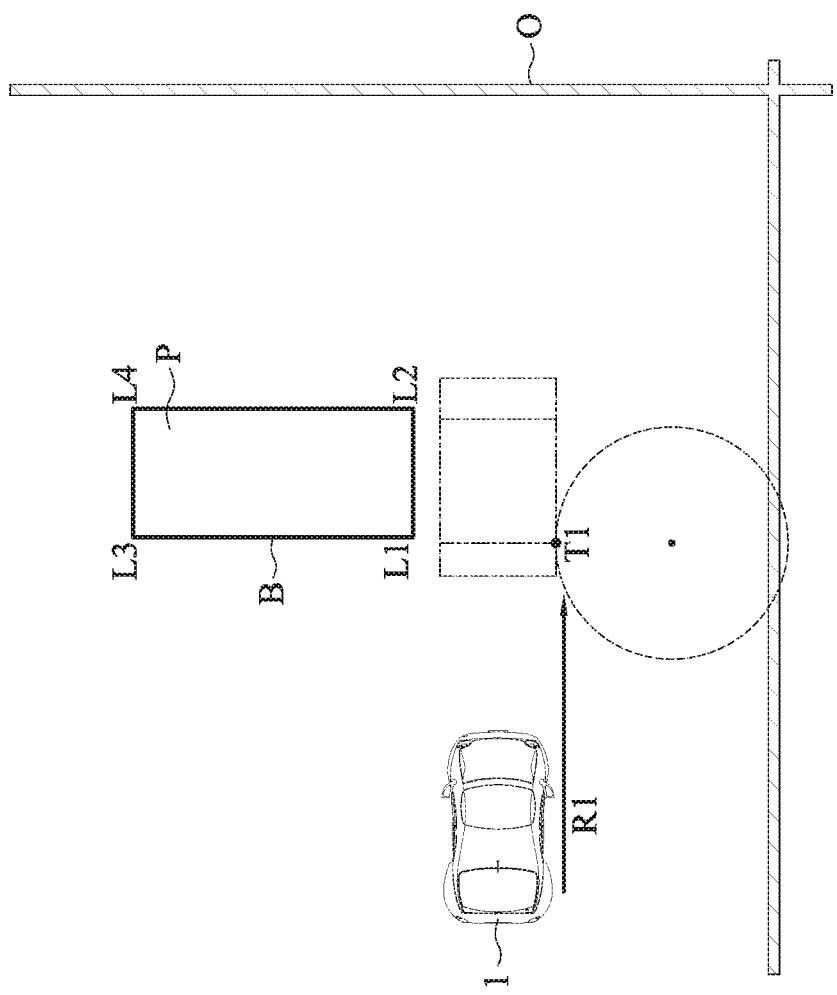
FIG. 4 is a schematic diagram depicting a first straight path of a parking path planned by the parking guidance system and the automatic parking system in accordance with a first embodiment of the present disclosure.

Simply put, the present disclosure only needs to determine the values of the two parameters (the first angle $\alpha 1$ and the first constant b) for the parking path planning module 121 to plan a parking path that includes the first straight path R1, the first turning path R2, the second straight path R3, the second turning path R4, and the intra-parking-space path R5, each of which will be described in details below. First, as shown in FIG. 4, the first straight path R1 is a trajectory along which the vehicle 1 will travel to a first turning point T1.

Next, as shown in FIG. 5, the vehicle 1 makes a turn by following a first turning circle C1, thereby forming the pre-planned first turning path R2. The first turning path R2 is an arc along which the vehicle 1 turns the first angle $\alpha 1$ from the first turning point T1 along the circumference of the first turning circle C1. The distance between the first turning point T1 and the center of the first turning circle C1 is the radius of the first turning circle C1. The first angle $\alpha 1$ is the angle of the turn formed by the vehicle 1 traveling from the first turning point T1 along the circumference of the first turning circle C1 to an end point of the first turning path R2.

Figure 6:
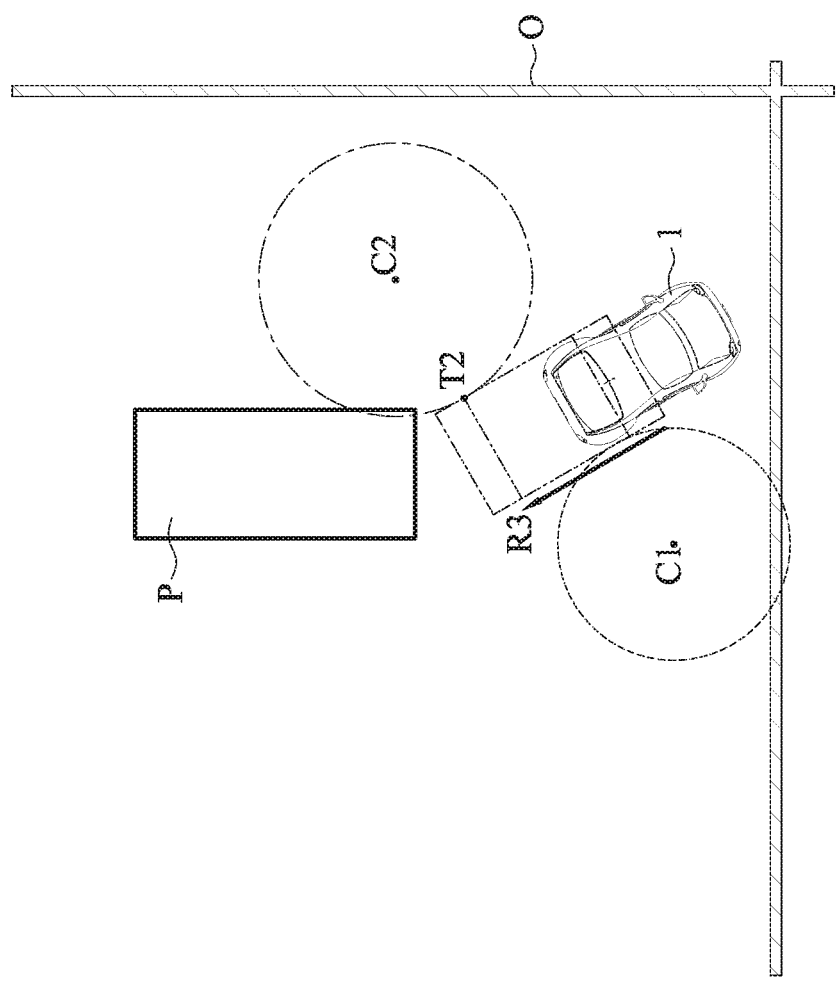
FIG. 6 is a schematic diagram depicting a second straight path of the parking path planned by the parking guidance system and the automatic parking system in accordance with the first embodiment of the present disclosure.

Next, as shown in FIG. 6, the vehicle 1 continues the second straight path R3 planned by the parking path planning module 121 in advance. The second straight path R3 is a trajectory along which the vehicle 1 will travel from the end point of the first turning path R2 to a second turning point T2. In some embodiments, the distance of the second straight path R3 can be zero, that is, the end point of the first turning path R2 is at the same position as the second turning point T2.

Figure 7:
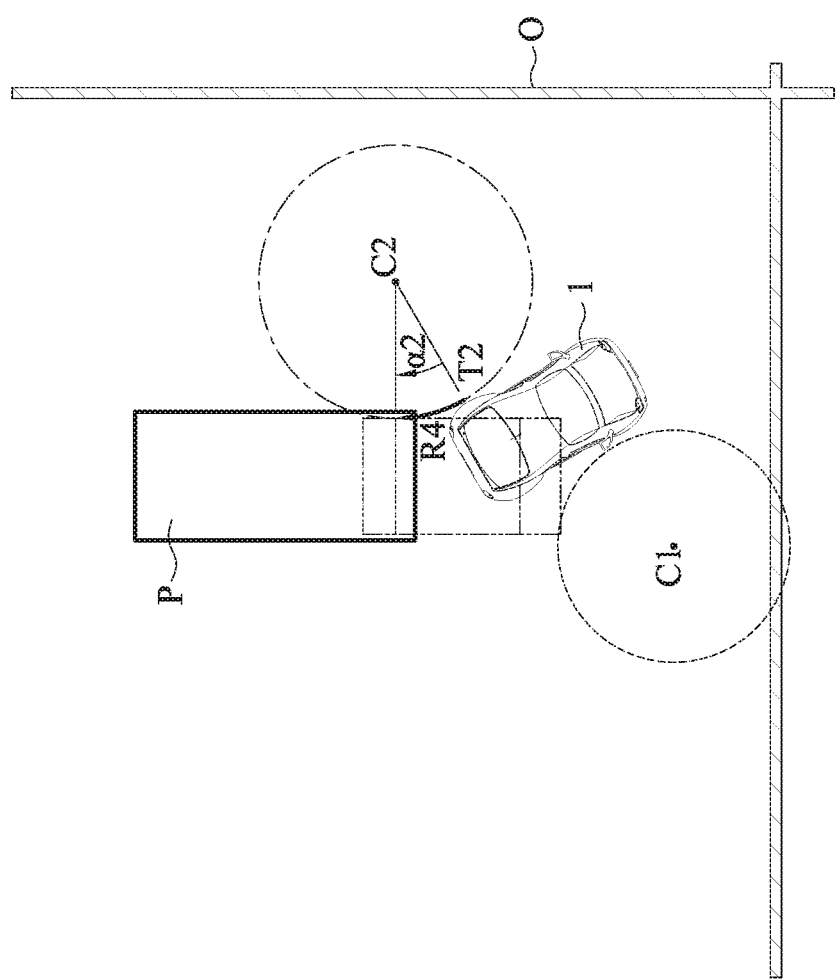
FIG. 7 is a schematic diagram depicting a second turning path of the parking path planned by the parking guidance system and the automatic parking system in accordance with the first embodiment of the present disclosure.

Then, as shown in FIG. 7, the vehicle 1 makes a turn by following a second turning circle C2, thereby forming the second turning path R4 planned by the parking path planning module 121 in advance. As such, the vehicle 1 partially enters into the parking space P. The second turning path R4 is an arc along which the vehicle 1 turns a second angle α2 from the second turning point T1 along the circumference of the second turning circle C2, wherein the sum of the first angle α1 and the second angle α2 is the angle β between the parallel line of the first straight path R1 and the marking, wherein the second turning point T2 is at the point of intersection of the second turning circle C2 and the second straight path R3. The distance between the second turning point T2 and the center of the second turning circle C2 is the radius of the second turning circle C2.

Figure 8:
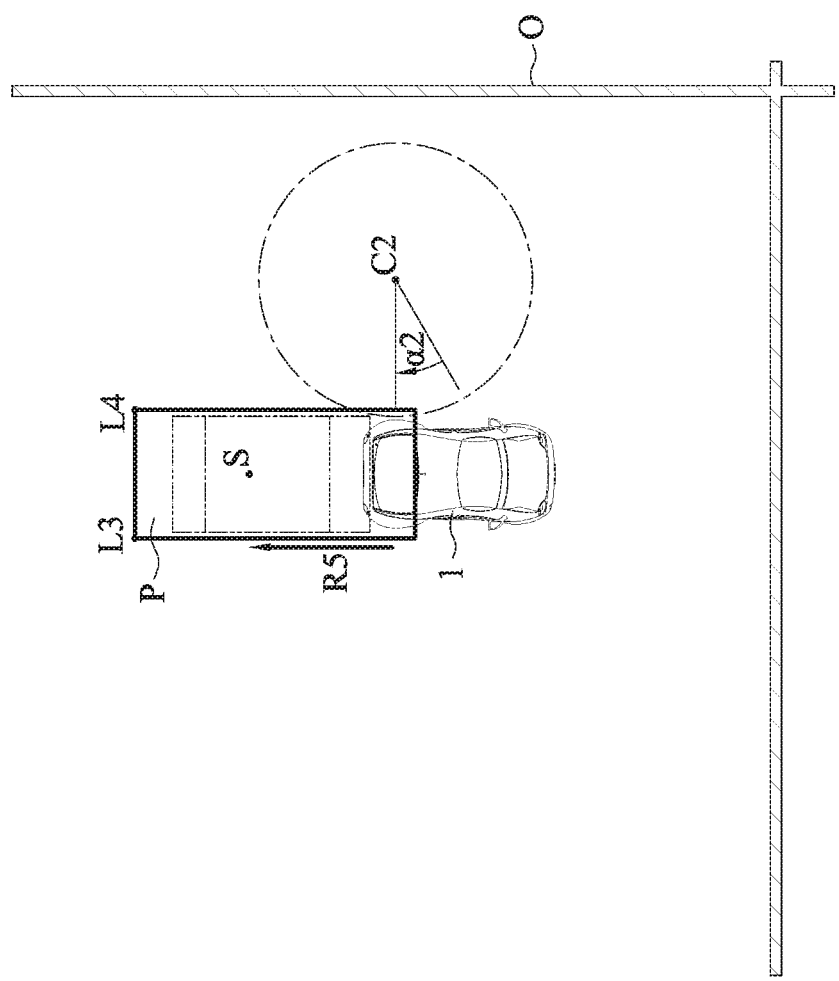
FIG. 8 is a schematic diagram depicting an intra-parking-space path of the parking path planned by the parking guidance system and the automatic parking system in accordance with the first embodiment of the present disclosure.

Next, as shown in FIG. 8, the vehicle 1 travels along the intra-parking-space path R5. The intra-parking-space path R5 is a trajectory along which the vehicle 1 will travel from an end point of the second turning path R4 to a stop point S. The stop point S can be an appropriate parking position relative to the corner points L3 and L4 of the parking space P, for example, the gaps between the vehicle 1 and the markings on both sides thereof are the same.

In some embodiments, the onboard controller 12 according to the present disclosure further includes a path correction module 124 for correcting the parking routes along which the vehicle 1 travels. When discovering that the vehicle 1 is not on a parking path predetermined by the parking path planning module 121, the onboard controller 12 can correct the parking route subsequent to the stage of the first straight path R1, the first turning path R2, the second straight path R3, the second turning path R4, or the intra-parking-space path R5. In other words, the timing for correcting a parking route performed by the path correction module 124 is at the end of a stage of the first straight path R1, the first turning path R2, the second straight path R3, the second turning path R4, or the intra-parking-space path R5. The path correction module 124 checks the difference between an actual and a target path (e.g., target locations such as the first turning point T1/the second turning point T2/the stop point S or target angles such as the first angle α1/the second angle α2) for correcting subsequent parking route.

Furthermore, the correction of the parking route of the vehicle 1 can be performed in segments. For example, a route to be corrected can be any path before the vehicle 1 enters into the parking space P, i.e., any path between first straight path R1 and second turning path R4, e.g., any one of R1-R4 shown in FIGS. 4 to 7. The parking path planning module 121 may then re-plan at least one of the paths R1-R4 based on the result detected by the parking space information capturing unit 11, or may perform slight correction without re-planning the entire path, for example, by proportionally adjusting at least one of the paths R1-R4.

In some embodiments, a route to be corrected can be a path after the vehicle 1 has entered into the parking space P, e.g., the intra-parking-space path R5. The path correction module 124 may then re-calculate and correct the subsequent parking route based on the relative positions of the two corner points L3 and L4 of the parking space P with respect to the vehicle 1 in order for the vehicle 1 to reach the stop point S, e.g., the intra-parking-space path R5 shown in FIG. 8.

In some embodiments, the parking guidance system according to the present disclosure further includes the heading angle information acquiring unit 13 for acquiring a navigation angle of the vehicle 1, wherein the heading angle information acquiring unit 13 can be an inertia sensing element or Global Navigation Satellite Positioning System. In some embodiments, the heading angle information can also be obtained using image recognition. In other words, the heading angle information acquiring unit 13 can also be an image recognition device. When the parking space information capturing unit 11 cannot capture an image associated with the parking space, the heading angle information acquiring unit 13 can be used to acquire the heading angle information to assist in the correction of the parking routes and parking guidance for the vehicle 1.

In some embodiments, the parking guidance system according to the present disclosure further includes a parking space estimation module 125 for estimating the relative position of the parking space P with respect to the vehicle 1. In some embodiments, the parking space estimation module 125 can be a distance sensor for detecting the distance of an obstacle or an ambient boundary when there is misjudgment or failure in image recognition. In some other embodiments, the parking space estimation module 125 can also be a processing unit used in cooperation with the heading angle information acquiring unit 13. In other words, when there is misjudgment or failure in image recognition performed by the parking space information capturing unit 11 or during a period in which image recognition is unstable, the heading angle information acquiring unit 13 can also be initiated to obtain heading angle information of the vehicle 1. At the same time, the parking space estimation module 125 can be used to estimate the relative position of the parking space P with respect to the vehicle 1 to assist the onboard controller 12 in resuming and finishing the parking process.

In some embodiments, the parking guidance system according to the present disclosure further includes an image display device 14 for displaying the parking paths. The image display device 14 can indicate the first straight path R1, the first turning path R2, the second straight path R3, the second turning path R4 and the intra-parking-space path R5 on its screen for parking guidance.

In some embodiments, based on the parking paths, the image display device 14 can also provide recommended corresponding actions to be carried out by the vehicle for the first straight path R1, the first turning path R2, the second straight path R3, the second turning path R4 and the intra-parking-space path R5. For example, some corresponding actions can be (1) first stage (performing the first straight path R1): drive straight until reaching the location of the first turning circle C1; brake to a stop; turn the steering wheel to the right by certain degrees; and check whether the stop location matches a target location (e.g., the first turning point T1), if not, then adjust the target location or target angle in the subsequent stage; (2) second stage (performing the first turning path R2): let the vehicle 1 travel along the first turning circle C1 and brake when the angle between the vehicle and the parking space is the first angle α1; return the steering wheel to the center; check whether the direction the vehicle is heading matches the target, if not, then adjust the target location or target angle in the subsequent stage; (3) third stage (performing the second straight path R3): reverse the vehicle 1 in a straight line to adjust the distance with the parking space; brake when it touches the second turning circle C2; check whether the stop location matches a target location (e.g., the second turning point T2), if not, then adjust the size of the second turning circle C2 (adjusting a left-turning angle); and turn the steering wheel to the left by certain degrees; (4) fourth stage (performing the second turning path R4): reverse the vehicle 1 along the second turning circle C2 and brake when the vehicle is in parallel with the parking space; return the steering wheel to the center; check whether the direction the vehicle is heading matches the target (whether the vehicle and the parking space are in parallel), if not, then adjust in the subsequent stage; (5) fifth stage (performing the intra-parking-space path R5): reverse the vehicle 1 to adjust the distance with the markings of the parking space, meanwhile a parking space center line is defined based on the corner points L3 and L4 of the parking space P; adjust the turning angle of the steering wheel such that the vehicle 1 steers towards the center line; and brake to a stop when the rear end of the vehicle is at a certain distance from the line connecting the corner points L3 and L4, thereby completing the parking process.

In other words, the user of the vehicle 1 may refer to a set of recommended actions of parking guidance displayed on the image display device 14 when manually carrying out a parking process. Alternatively, automatic parking can be performed using a parking actuation control module 123 in the onboard controller 12.

Figure 9:
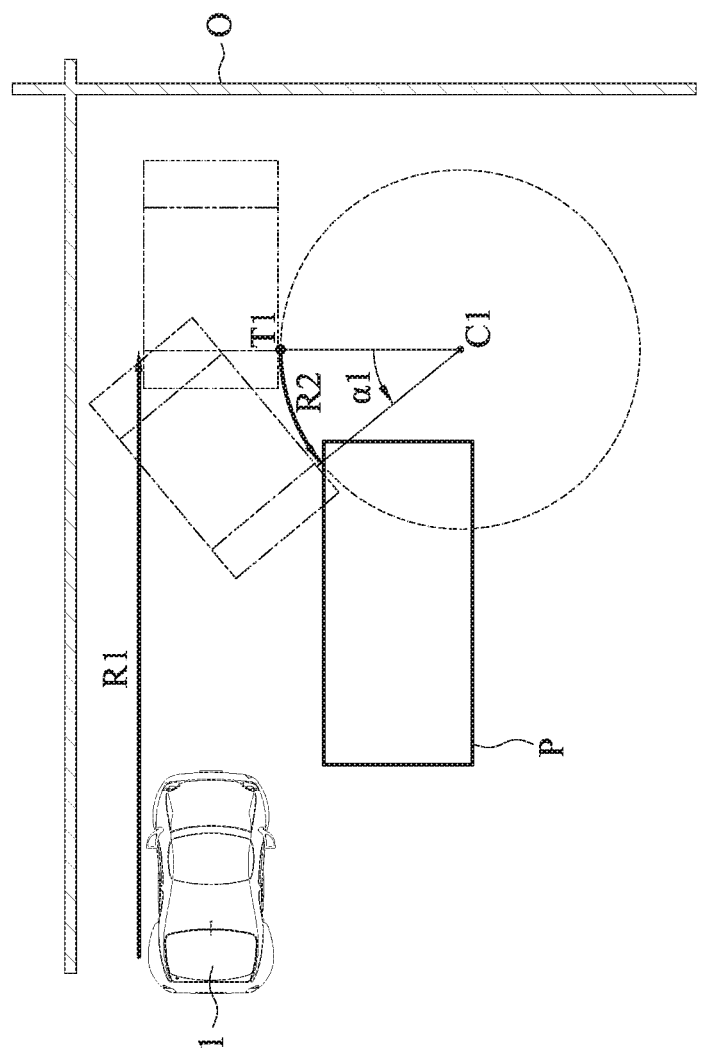
FIG. 9 is a schematic diagram depicting a first straight path and a first turning path of a parking path planned by the parking guidance system and the automatic parking system in accordance with a second embodiment of the present disclosure.
Figure 10:
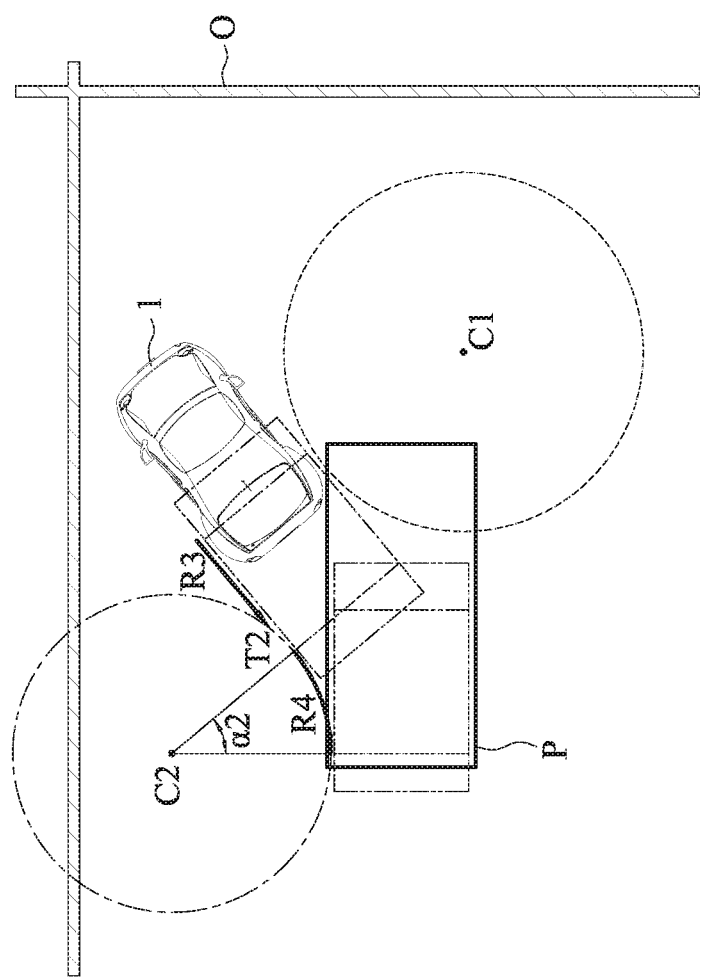
FIG. 10 is a schematic diagram depicting a second straight path and a second turning path of a parking path planned by the parking guidance system and the automatic parking system in accordance with the second embodiment of the present disclosure.
Figure 11:
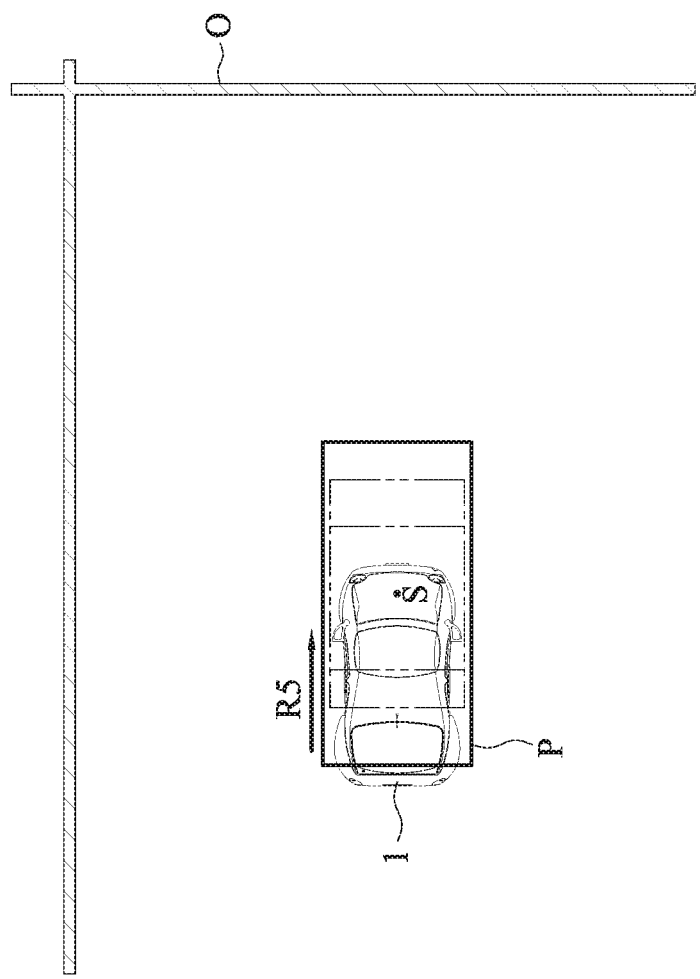
FIG. 11 is a schematic diagram depicting an intra-parking-space path of the parking path planned by the parking guidance system and the automatic parking system in accordance with the second embodiment of the present disclosure.

FIGS. 9-11 are schematic diagrams illustrating a first straight path R1, a first turning path R2, a second straight path R3, a second turning path R4 and an intra-parking-space path R5 planned by the parking guidance system and the automatic parking system in accordance with a second embodiment of the present disclosure. The main difference between the second embodiment and the first embodiment is in that parallel parking by "reversing into the parking space" is performed in this embodiment. The differences are in the angle β, which is 90 degrees in the first embodiment, and zero in this embodiment, and α1=−α2. The rest of the parking paths are similar to those in the first embodiment, and will not be repeated.

Figure 12:
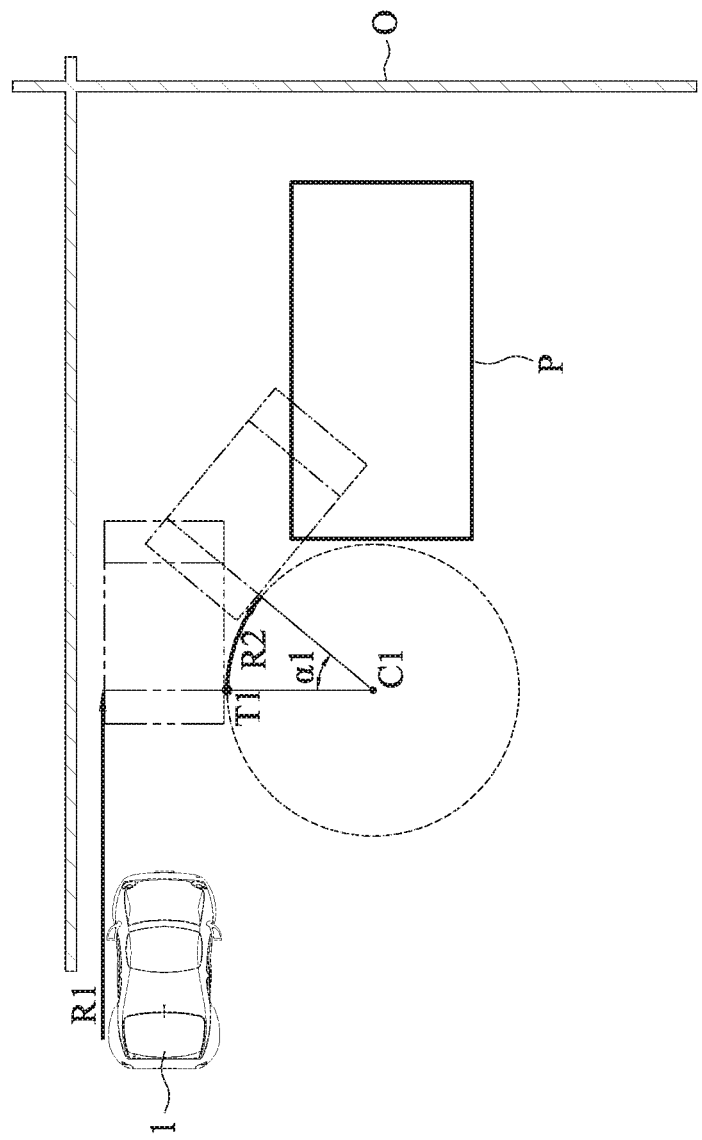
FIG. 12 is a schematic diagram depicting a first straight path and a first turning path of a parking path planned by the parking guidance system and the automatic parking system in accordance with a third embodiment of the present disclosure.
Figure 13:
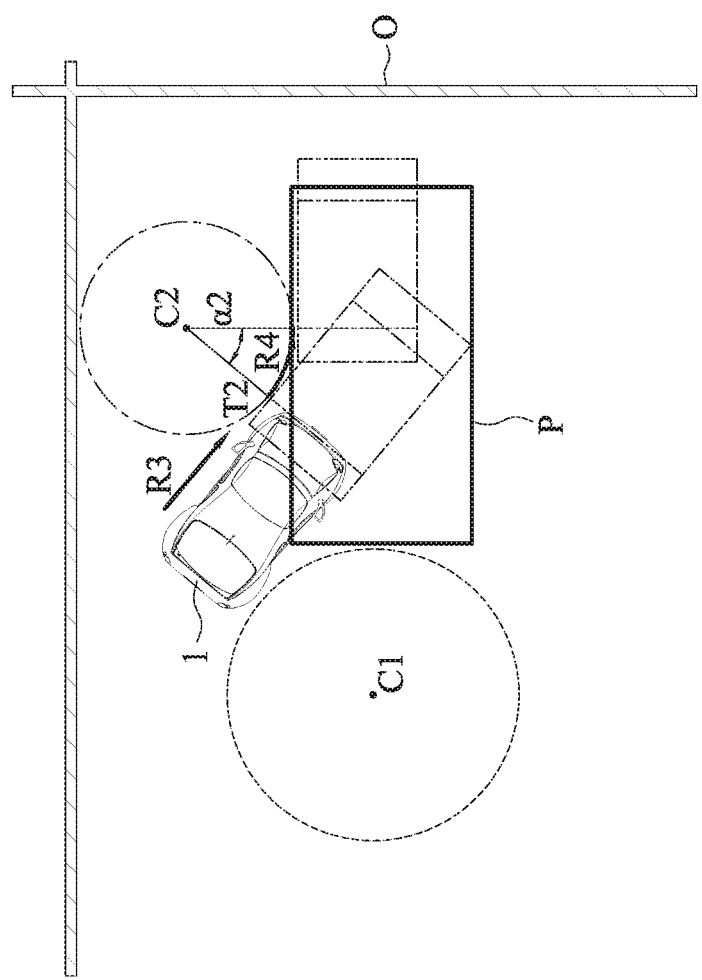
FIG. 13 is a schematic diagram depicting a second straight path and a second turning path of a parking path planned by the parking guidance system and the automatic parking system in accordance with the third embodiment of the present disclosure.
Figure 14:
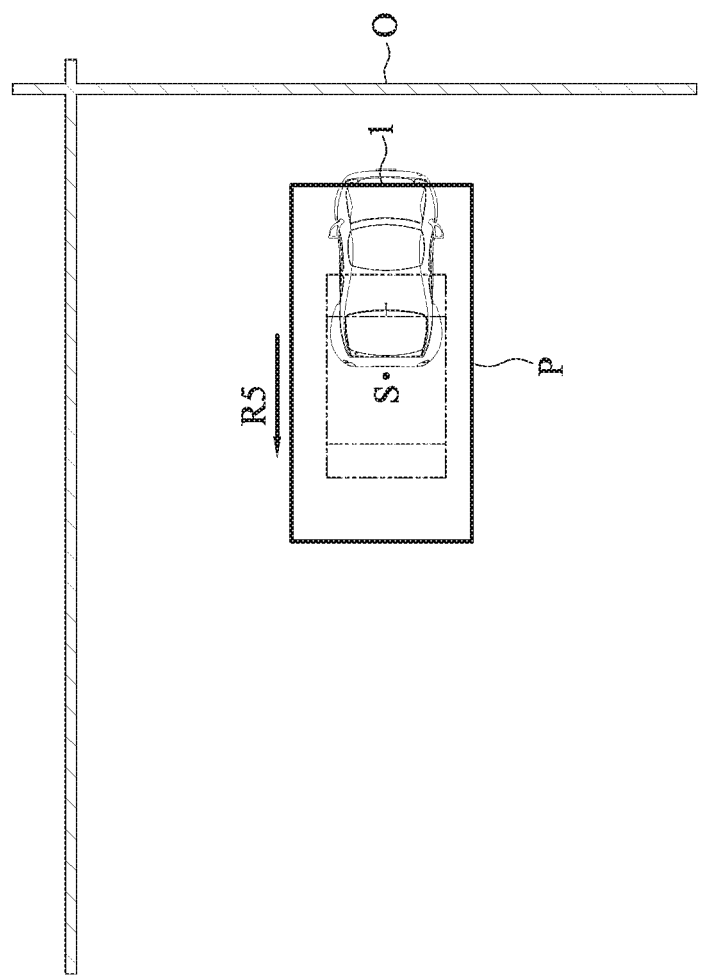
FIG. 14 is a schematic diagram depicting an intra-parking-space path of the parking path planned by the parking guidance system and the automatic parking system in accordance with the third embodiment of the present disclosure.

FIGS. 12-14 are schematic diagrams illustrating a first straight path R1, a first turning path R2, a second straight path R3, a second turning path R4 and an intra-parking-space path R5 planned by the parking guidance system and the automatic parking system in accordance with a third embodiment of the present disclosure. The main difference between the third embodiment and the first embodiment is in that parallel parking by "driving front-first" into the parking space is performed in this embodiment. The differences are that the first turning circle C1 and the second turning circle C2 are on the same side of the vehicle 1, and the first turning path R2 involves turning the car towards the parking space P. The rest of the parking paths are similar to those in the first embodiment, and will not be repeated.

In conclusion, the parking guidance system according to the present disclosure first employs the parking space information capturing unit 11 to obtain position information of a plurality of corner points L1 and L2 and/or a line marking B of a parking space P through image recognition in order to know the relative position of the parking space P with respect to a vehicle 1. Then, based on the position information of the plurality of corner points L1 and L2 and/or the line marking B of the parking space P obtained by the parking space information capturing unit 11, a route composed of a first straight path R1, a first turning path R2, a second straight path R3, a second turning path R4 and an intra-parking-space path R5 is planned and composition parameters of the route are analyzed. Thereafter, a first angle α1 and a first constant b are defined using the composition parameters. Next, the first angle α1 and the first constant b are inputted into an algorithm built into the parking path planning module 121 to calculate a parking path, wherein the first constant b is the gap between a baseline extending from the center of a first turning circle C1 and the line marking B and the first angle α1 is a turning angle formed by the vehicle 1 traveling from a first turning point T1 along the circumference of the first turning circle C1 to the end point of the first turning path R2. From the first angle α1 and the first constant b, a parking path can be calculated and planned without the need to input other complicated parameters. The parking guidance module 122 uses the parking paths planned by the parking path planning module 121 to guide the user in manually or automatically driving the vehicle 1 to complete the parking process.

Figure 15:
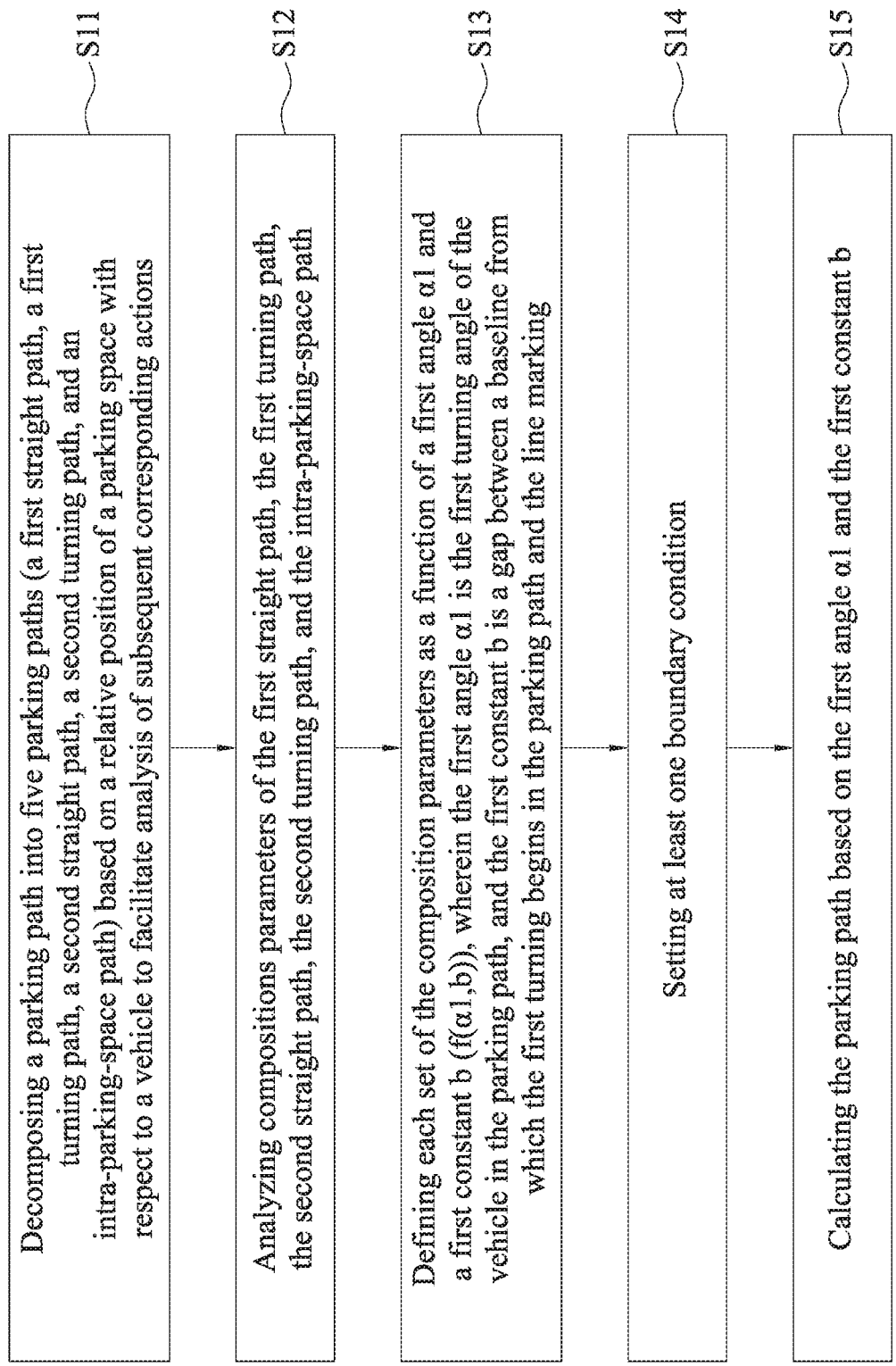
FIG. 15 is a flowchart illustrating parking path planning of a parking guidance method in accordance with the present disclosure.
Figure 16:
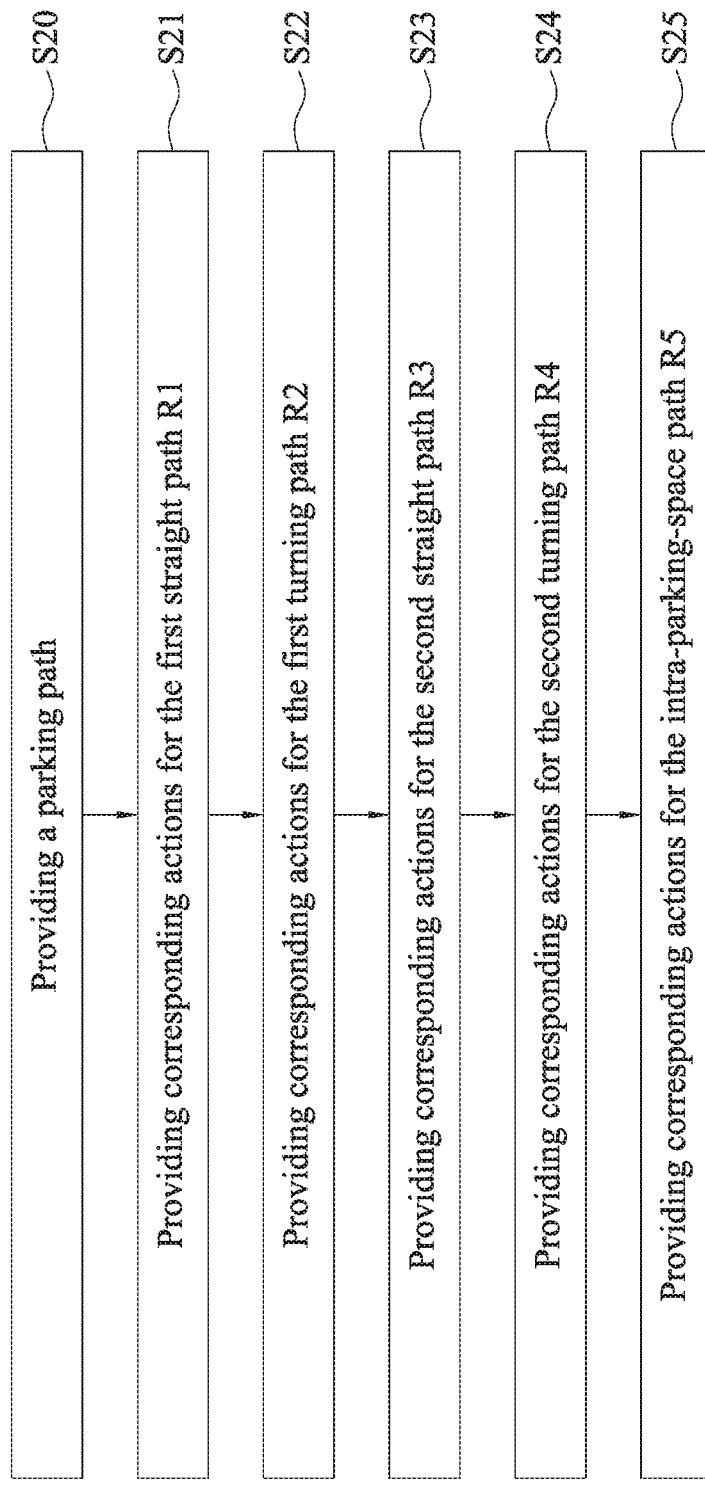
FIG. 16 is a flowchart illustrating parking guidance of a parking guidance method in accordance with the present disclosure.
Figure 17:
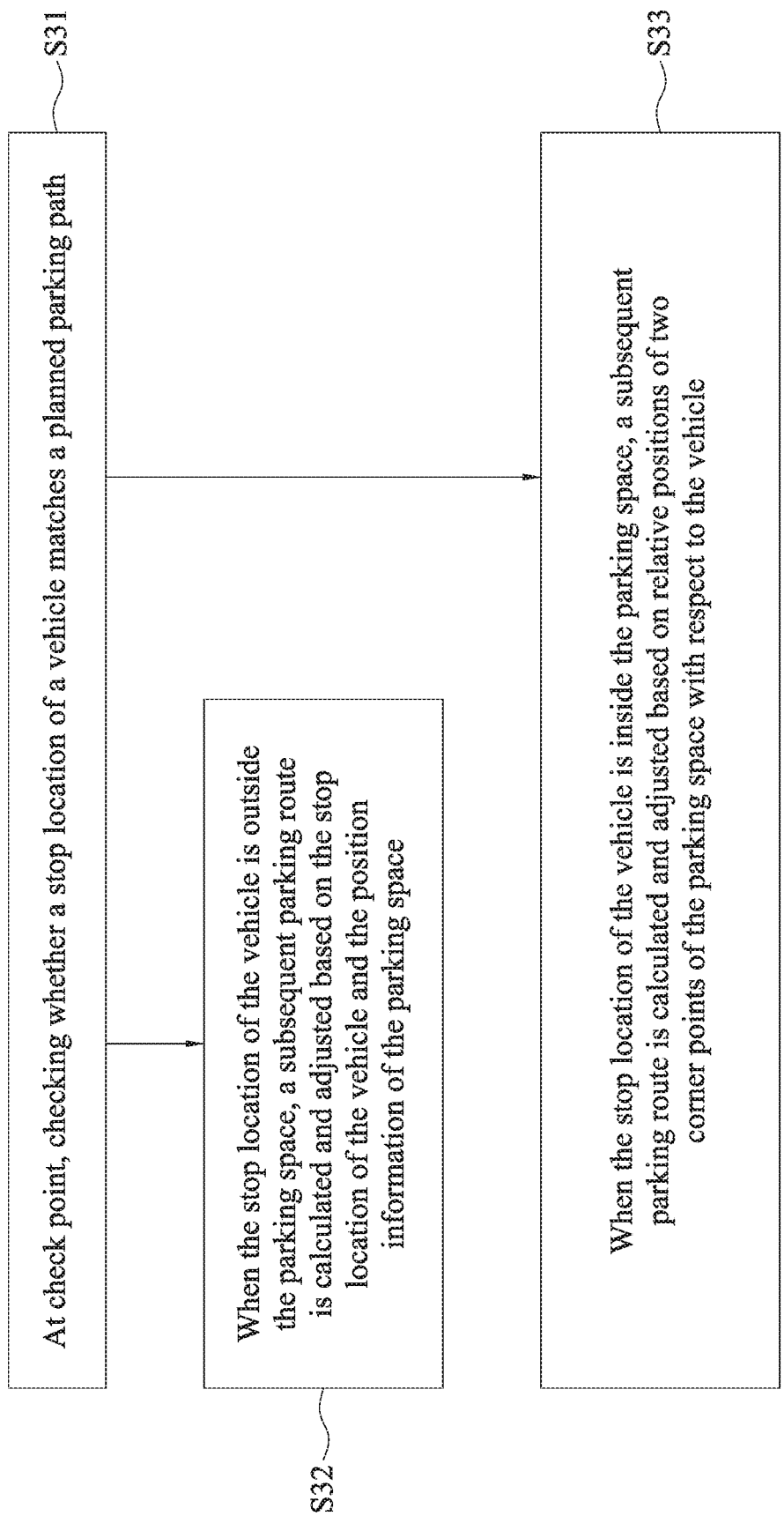
FIG. 17 is a flowchart illustrating parking path correction of a parking guidance method in accordance with the present disclosure.

FIGS. 15-17 are flowcharts illustrating parking path planning, parking guidance and parking path correction in a parking guidance method according to the present disclosure. After a plurality of corner points L1 and L2 and/or a line marking B are obtained by the parking space information capturing unit 11, the parking path planning module 121 plans parking paths based on the plurality of corner points L1 and L2 and/or the line marking B to assist the onboard controller 12 in providing parking guidance based on the parking paths. As can be seen from the flowchart of FIG. 15, the parking path planning in the parking guidance method according to the present disclosure includes the following steps S11-S15.

Step S11: Based on the relative position of a parking space with respect to a vehicle, a parking path is decomposed into five parking paths: a first straight path, a first turning path, a second straight path, a second turning path, and an intra-parking-space path to facilitate analysis of subsequent corresponding actions.

Step S12: Compositions parameters of the first straight path, the first turning path, the second straight path, the second turning path, and the intra-parking-space path are analyzed. The composition parameters may be, for example, the gap between a front obstacle vehicle and the marking, the gap between a rear obstacle vehicle and the marking, the width of the vehicle, the road width, and total length of the movement path.

Step S13: Each set of composition parameters are defined as a function of a first angle α1 and a first constant b (f(α1,b)), wherein the first angle α1 is a first turning angle of the vehicle 1 in the parking path, and the first constant b is the gap between a baseline from which the first turning begins in the parking path and the line marking B (see FIG. 5).

Step S14: At least one boundary condition is set. In some embodiments, the parking path planning module 121 may set at least one boundary condition after each set of composition parameters are defined as a function of the first angle α1 and the first constant b (f(α1,b)). The boundary condition includes the location of at least one obstacle O or an ambient boundary range. In other words, the boundary condition is an ambient boundary or the boundary of an obstacle O. The obstacle O can be a fence, a low wall, a nearby car, a utility pole or the like. The vehicle 1 should avoid from coming into contact with the obstacle O when moving. The setup of the boundary condition may restrict the range of the values of the first angle α1 and the first constant b. This also in turn reduces the computation time for subsequent path planning.

Step S15: The parking path is calculated based on the first angle α1 and the first constant b. In particular, a best parking path is calculated by combining the first straight path, the first turning path, the second straight path, the second turning path, and the intra-parking-space path using the determined first angle $\alpha 1$ and the first constant b as well as the resources owned by the system. In some embodiments, if the surrounding environment condition is simple, e.g., no obstacles (e.g., nearby cars), a predetermined route can be used without re-calculating. In some embodiments, when the parking space information capturing unit 11 detects obstacle information (e.g., a nearby car) around the parking space, the parking path planning module 121 plans a safer and more conservative parking path based on the obstacle information to prevent the vehicle 1 from hitting these obstacles. In some other embodiments, when the parking space information capturing unit 11 detects obstacles around the parking space and is able to accurately locate the obstacles, the parking path planning module 121 calculates the shortest parking path using an iterative method.

It can be understood from the above that the present disclosure is capable of simplifying numerous composition parameters into just two necessary parameters (the first angle $\alpha 1$ and the first constant b), which greatly reduces subsequent computation time and in turn the time required for parking.

FIG. 16 is a flowchart illustrating parking guidance in the parking guidance method according to the present disclosure. The user of the vehicle 1 may carry out a set of actions provided by the parking guidance module 122 for manual or automatic parking by referring to the parking guidance displayed on the image display device 14. As can be seen from FIG. 16, the parking guidance of the parking guidance method according to the present disclosure includes the following steps:

Step S20: a parking path is provided. The image display device 14 indicates the first straight path R1, the first turning path R2, the second straight path R3, the second turning path R4, and the intra-parking-space path R5 on the screen, wherein paths R1-R5 can be provided by the parking path planning method above or other methods.

Step S21: Corresponding actions are provided for the first straight path R1: drive the vehicle 1 in a straight line along the first straight path R1 until reaching the location of the first turning circle C1; brake to a stop; turn the steering wheel to the right by certain degrees; and check whether the stop location matches a target location (e.g., the first turning point T1).

Step S22: Corresponding actions are provided for the first turning path R2: let the vehicle 1 travel along the first turning circle C1 and brake when the angle between the vehicle and the parking space is the first angle $\alpha 1$; and return the steering wheel to the center.

Step S23: Corresponding actions are provided for the second straight path R3: reverse the vehicle 1 in a straight line to adjust the distance with the parking space; brake when it touches the second turning circle C2; and check whether the stop location matches a target location (e.g., the second turning point T2).

Step S24: Corresponding actions are provided for the second turning path R4: reverse the vehicle 1 along the second turning circle C2 and brake when the vehicle is in parallel with the parking space; return the steering wheel to the center; and check whether the direction the vehicle and the parking space are in parallel.

Step S25: Corresponding actions are provided for the intra-parking-space path R5: reverse the vehicle 1 to adjust the distance with the markings of the parking space, and meanwhile define a parking space center line based on the corner points L3 and L4 of the parking space P; adjust the turning angle of the steering wheel such that the vehicle 1 steers towards the center line; and brake to a stop when the rear end of the vehicle is at a certain distance from the line connecting the corner points L3 and L4, thereby completing the parking process.

It can be understood from the above that the present disclosure help a user in manually completing a parking process by suggesting corresponding actions of parking guidance displayed on the image display device 14.

FIG. 17 is a flowchart illustrating parking path correction in the parking guidance method according to the present disclosure. As seen, the parking path correction according to the parking guidance method includes the following steps:

Step S31: At a check point(e.g., a target location such as the first turning point T1/the second turning point T2/the stop point or a target angle such as the first angle $\alpha 1$/second angle $\alpha 2$), check whether the stop location of the vehicle 1 matches the planned parking path. If not, it is determined whether the stop location of the vehicle 1 is (1) outside the parking space (e.g., near the first straight path R1, the first turning path R2, the second straight path R3, or the second turning path R4), or (2) inside the parking space (e.g., near the intra-parking-space path R5). If the stop location of the vehicle 1 is near the first straight path R1, the first turning path R2, the second straight path R3, or the second turning path R4 (i.e. outside the parking space), then proceed to step S32. If the stop location of the vehicle 1 is near the intra-parking-space path R5 (i.e. inside the parking space), then proceed to step S33.

Step S32: When the stop location of the vehicle 1 is outside the parking space, a subsequent parking route is calculated and adjusted based on the stop location of the vehicle 1 and the position information of the parking space P. In an embodiment, at least one of the paths R1-R4 can be re-planned or adjusted only slightly, for example, the subsequent parking route of at least one of the paths R1-R4 is proportionally adjusted, and then, after the vehicle 1 enters into the parking space, the difference between the target and the actual values are determined and adjustments are made accordingly.

Step S33: When the stop location of the vehicle 1 is inside the parking space, a subsequent parking route is calculated and adjusted based on the relative positions of the two corner points of the parking space P with respect to the vehicle 1. More specifically, parking path correction is performed by calculating a subsequent parking route of the vehicle 1 based on the relative positions of the two corner points of the parking space P with respect to the vehicle 1.

The present disclosure further includes an automatic parking system, including a parking space information capturing unit 11 and an onboard controller 12. Compared to the parking guidance system, the onboard controller 12 of the automatic parking system further includes a parking actuation control module 123. The other components of the automatic parking system are the same as those of the parking guidance system, so they will not be further described.

The parking actuation control module 123 is used for performing actuation control of a vehicle 1 based on the parking guidance, such that the vehicle 1 automatically completes a parking process. In other words, a user can choose whether to manually perform parking into a parking space under the assistance of the parking guidance system of the present disclosure or allow the parking actuation control module 123 of the automatic parking system according to the present disclosure to control acceleration, braking, turning, and gear switching of the vehicle 1 to achieve automatic parking of the vehicle 1.

In conclusion of the above, the parking guidance system, the parking guidance method and the automatic parking system according to the present disclosure determine the relative position of the parking space with respect to the vehicle by identifying a line marking B and the corner points for the parking space and plans an appropriate parking path after taking into account both surrounding information and vehicle status information, wherein the parking path planning includes calculating the parking path based on a first angle $\alpha 1$ and a first constant b obtained, wherein the first constant b is the gap between a baseline extending from the center of a first turning circle C1 and the line marking B and the first angle $\alpha 1$ is a turning angle formed by the vehicle 1 traveling from a first turning point T1 along the circumference of the first turning circle C1 to the end point of a first turning path R2. With the first angle $\alpha 1$ and the first constant b, the parking path can be planned without the need to input other complicated parameters. Thus, when there are only markings for a parking space on the ground without any nearby cars, the present disclosure is able to control acceleration, braking, turning, and gear switching of the vehicle via the onboard controller to perform automatic parking, or to indicate the parking path via the image display device to assist the user in manual parking, thereby addressing the safety and time-consuming issues encountered when parking a vehicle.

When there is misjudgment or failure in image recognition performed by the parking space information capturing unit or during a period in which image recognition is unstable, the heading angle information acquiring unit can also be initiated to obtain heading angle information of the vehicle. At the same time, the parking space estimation module can be used to estimate the relative position of the parking space with respect to the vehicle to assist the onboard controller in resuming and finishing the parking process.

The above embodiments are only used to illustrate the principles of the present disclosure, and should not be construed as to limit the present disclosure in any way. The above embodiments can be modified by those with ordinary skill in the art without departing from the scope of the present disclosure as defined in the following appended claims.

What is claimed is:

1. A parking guidance method, comprising:
    detecting a plurality of corner points of a parking space;
    planning a parking path of a vehicle based on the plurality of corner points, wherein the parking path includes:
        a first straight path, which is a trajectory that the vehicle will travel straight until reach a first turning point;
        a first turning path, which is an arc subtending a first angle that the vehicle will travel from the first turning point and turn along the circumference of a first turning circle;
        a second straight path, which is a trajectory that the vehicle will travel from a first end point of the first turning path to a second turning point;
        a second turning path, which is an arc subtending a second angle that the vehicle will travel from the second turning point and turn along the circumference of a second turning circle, wherein a sum of the first and second angles equal to an angle formed between a parallel line of the first straight path and a line marking for the parking space; and
        an intra-parking-space path, which is a trajectory that the vehicle will travel from a second end point of the second turning path to a stop point, and
    providing parking guidance based on the parking path.

2. The parking guidance method of claim 1, wherein the first turning point is located at a point of intersection between the first turning circle and the first straight path, and a distance between the first turning point and the center of the first turning circle is a radius of the first turning circle.

3. The parking guidance method of claim 1, wherein the second turning point is located at a point of intersection between the second turning circle and the second straight path, and a distance between the second turning point and the center of the second turning circle is a radius of the second turning circle.

4. The parking guidance method of claim 1, wherein a length of the second straight path is zero.

5. The parking guidance method of claim 1, further comprising estimating relative position of the parking space with respect to the vehicle.

6. The parking guidance method of claim 5, wherein planning the parking path includes:
    decomposing an intended parking path into the first straight path, the first turning path, the second straight path, the second turning path, and the intra-parking-space path based on the relative position of the parking space with respect to the vehicle;
    analyzing composition parameters of the first straight path, the first turning path, the second straight path, the second turning path, and the intra-parking-space path; and
    defining the composition parameters as a function of a first angle and a first constant, wherein the first constant is a gap between a baseline associated with the first turning path and the line marking, and the first angle is an angle formed by the vehicle traveling from the first turning point along the circumference of the first turning circle to the first end point of the first turning path.

7. The parking guidance method of claim 6, further comprising setting at least one boundary condition after the function of the first angle and the first constant is defined, wherein the boundary condition is an ambient boundary or an obstacle boundary used for restricting the range of the values of the first angle and the first constant.

8. The parking guidance method of claim 7, further comprising, after setting the boundary condition, calculating the parking path using the restricted values of the first angle and the first constant.

9. The parking guidance method of claim 5, further comprising:
    determining whether the vehicle is on the planned parking path when the vehicle reaches the first turning point, the first end point of the first turning path, the second turning point, or the second end point of the second straight path; if not, correcting a subsequent parking route traveled by the vehicle.

10. The parking guidance method of claim 9, wherein the corrected subsequent parking route traveled by the vehicle is any path between the first straight path and the second turning path, and the subsequent parking route traveled by the vehicle is calculated and corrected based on the estimated relative position of the parking space with respect to the vehicle.

11. The parking guidance method of claim 9, wherein the corrected subsequent parking route traveled by the vehicle is the intra-parking-space path, and the subsequent parking route traveled by the vehicle is calculated and corrected based on relative positions of two corner points of the parking space with respect to the vehicle.

12. The parking guidance method of claim 1, further comprising acquiring heading angle information of the vehicle and using the heading angle information to estimate relative position of the parking space with respect to the vehicle.

13. The parking guidance method of claim 1, wherein the first straight path, the first turning path, the second straight path, the second turning path, and the intra-parking-space path on the parking path are demonstrated by an image display device.

14. The parking guidance method of claim 13, wherein the parking guidance further includes:
providing action suggestions to be taken by the vehicle with regard to the first straight path, the first turning path, the second straight path, the second turning path, or the intra-parking-space path based on the parking path.

15. A parking guidance system, comprising:
a parking space information capturing unit configured for obtaining position information of a plurality of corner points of a parking space through image recognition; and
an onboard controller including:
a parking path planning module configured for planning a parking path for the vehicle based on the position information of the corner points; and
a parking guidance module configured for providing parking guidance based on the parking path.

16. The parking guidance system of claim 15, further comprising a heading angle information acquiring unit configured for acquiring heading angle information of the vehicle.

17. The parking guidance system of claim 15, wherein the onboard controller further includes a path correction module configured for correcting a parking route traveled by the vehicle.

18. The parking guidance system of claim 15, wherein the onboard controller further includes a parking space estimation module configured for estimating relative position of the parking space with respect to the vehicle.

19. The parking guidance system of claim 15, further comprising an image display device configured for displaying the parking path.

20. An automatic parking system, comprising:
a parking space information capturing unit configured for obtaining position information of a plurality of corner points of a parking space through image recognition; and
an onboard controller including:
a parking path planning module configured for planning a parking path for the vehicle based on the position information of the corner points;
a parking guidance module configured for providing parking guidance based on the parking path; and
a parking actuation control module configured for performing actuation control on the vehicle based on the parking guidance to allow the vehicle to complete a parking process.

* * * * *

UNITED STATES PATENT AND TRADEMARK OFFICE
CERTIFICATE OF CORRECTION

PATENT NO. : 10,822,030 B2  
APPLICATION NO. : 15/840012  
DATED : November 3, 2020  
INVENTOR(S) : Lee et al.

Page 1 of 1

It is certified that error appears in the above-identified patent and that said Letters Patent is hereby corrected as shown below:

On the Title Page

Item (73), the Assignee, is listed as:
INDUSTRIAL TECHNOLOGY RESEARCH INSTITUTE, Hsinchu (JP)

It should read:
(73) Assignee: INDUSTRIAL TECHNOLOGY RESEARCH INSTITUTE, Hsinchu (TW)

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*